(12) United States Patent
La Scola et al.

(10) Patent No.: US 6,742,746 B1
(45) Date of Patent: Jun. 1, 2004

(54) OPTICAL CABLE GUIDE AND SUPPORT

(75) Inventors: Joseph D La Scola, Toms River, NJ (US); Michael Reilly, Jackson, NJ (US)

(73) Assignee: Internet Photonics, Inc., Shrewsbury, NJ (US)

( * ) Notice: Subject to any disclaimer, the term of this patent is extended or adjusted under 35 U.S.C. 154(b) by 0 days.

(21) Appl. No.: 10/006,917

(22) Filed: Nov. 8, 2001

(51) Int. Cl.[7] .................................................. F16L 3/00
(52) U.S. Cl. ............................. 248/49; 248/68.1; 248/70
(58) Field of Search ............................... 248/49, 58, 60, 248/68.1, 59, 65; 52/220.7, 36.5; 174/48, 68.3, 101, 72 A

(56) References Cited

U.S. PATENT DOCUMENTS

| | | | | |
|---|---|---|---|---|
| 3,321,571 A | * | 5/1967 | Lynch | 174/101 |
| 3,960,350 A | * | 6/1976 | Tardoskegyi | 248/589 |
| 4,145,853 A | * | 3/1979 | Bridwell | 174/48 |
| 4,372,511 A | * | 2/1983 | Knowles | 248/68.1 |
| 5,934,623 A | * | 8/1999 | Kopish | 248/65 |
| 6,158,180 A | * | 12/2000 | Edwards | 174/48 |
| 6,170,784 B1 | * | 1/2001 | MacDonald et al. | 248/65 |
| 6,274,814 B1 | * | 8/2001 | Iavarone | 174/100 |
| 6,300,561 B1 | * | 10/2001 | Saito et al. | 174/48 |
| 6,399,883 B1 | * | 6/2002 | Lhota | 174/101 |
| 6,402,096 B1 | * | 6/2002 | Ismert et al. | 24/271 |
| 2002/0047073 A1 | * | 4/2002 | Deciry et al. | 248/49 |

FOREIGN PATENT DOCUMENTS

GB       2124832 A   *   2/1984

* cited by examiner

Primary Examiner—Ramon O. Ramirez
Assistant Examiner—Tan Le
(74) Attorney, Agent, or Firm—Henry T. Brendzel

(57) ABSTRACT

As assembly for holding routing optical fibers from a rack-mounted equipment module includes a trough element and support elements that are adapted to attach the fiber-holding trough element in front of the front panel of the equipment module. In some embodiments, the trough element is a U-channel with its opening partially covered. Also in some embodiments, the support elements' are adjustable to permit placing the trough element at different distances from the front panel of the equipment module.

3 Claims, 4 Drawing Sheets

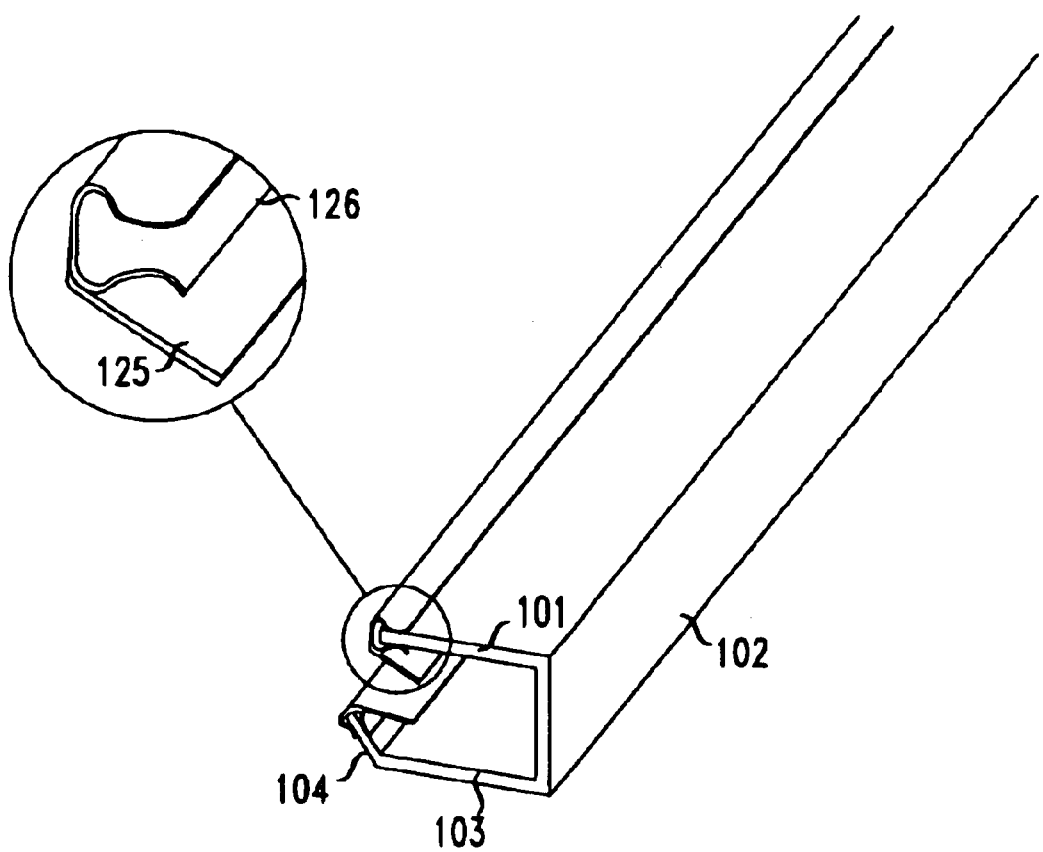

OPTICAL CABLE GUIDE AND SUPPORT

BACKGROUND OF THE INVENTION

This relates to mechanical guides and supports and, more particularly, to guides and supports for optical cables.

Figure 1:
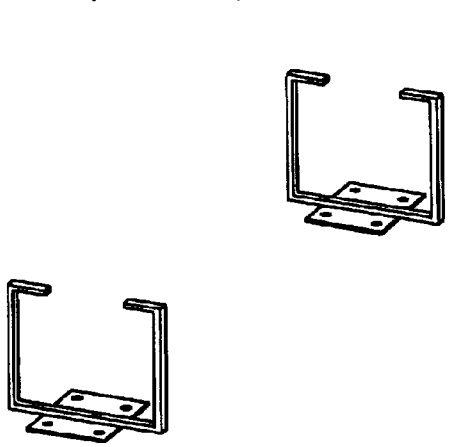
Figure 2:
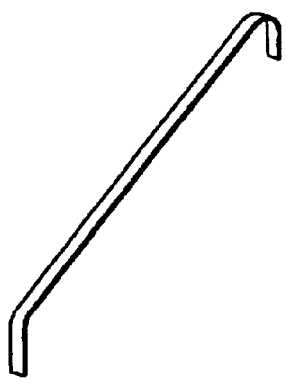

In central offices, and similar locations, interconnected telecommunication equipment modules have been typically housed in equipment racks on frames, and often separated by distances measured in feet. Their interconnections were typically done through wires, or wire cables, (wire elements) that stretched between the equipment modules and coupled to connectors, or plugs, at front panels of the equipment modules. The wire elements so connected were dressed (tied together) and, to provide physical support for the dressed wires, mechanical elements have been used, such as ring sets or "towel bars" to which the wire elements were attached with plastic ties, or "sewn" with waxed rope. An example of a commercially available wire-support ring is shown in FIG. 1, and an example of a "towel bar" is shown in FIG. 2. For longer distances, such as from one cabinet to another, large troughs have often been used, in which all the wire elements or cables were laid.

The telecommunication industry is moving in the direction of using optical fibers for communicating information, and not just for long distances, but also for relatively short ones, such as from the front panel of one rack-mounted module to another rack-mounted module on the same frame. The operating characteristics of optical fibers, however, are very sensitive to physical pressure on the fibers and, therefore, use of "towel bars" such as the one shown in FIG. 2, is somewhat problematic because of the necessary physical strapping of optical cable to the "towel bars." The use of rings such as the one shown in FIG. 1 may, similarly, be problematic because they provide inadequate protection against snagging of the optical fibers by workers and because they can easily contribute to a bending of the optical fibers with a bending radius that is too small (which, itself, imposes a physical stress on the fibers). In short, a need exists for a means that provides support for front-panel optical fiber connections, provides good routing guidance, and protects the fibers from inadvertent snagging.

SUMMARY OF THE INVENTION

The existing need is satisfied, and an advance in the art is achieved with an arrangement that includes a trough element for holding optical fibers, and support elements that are adapted to-attach the fiber-holding trough element to an equipment frame, an equipment rack, or to a telecommunication module. More specifically, the fiber-holding trough element and the support elements are interconnected to have the opening of the trough element generally face the front panel of the equipment module when the support elements are connected to the front panel of the telecommunication rack or to the equipment module. In some embodiments, the trough element is a channel with a cross section that is generally U-shaped, with its opening partially covered. Also in some embodiments, the support elements are adjustable, to permit placing the trough element at different distances from the front panel of the telecommunication rack.

BRIEF DESCRIPTION OF THE INVENTION

Figure 3:
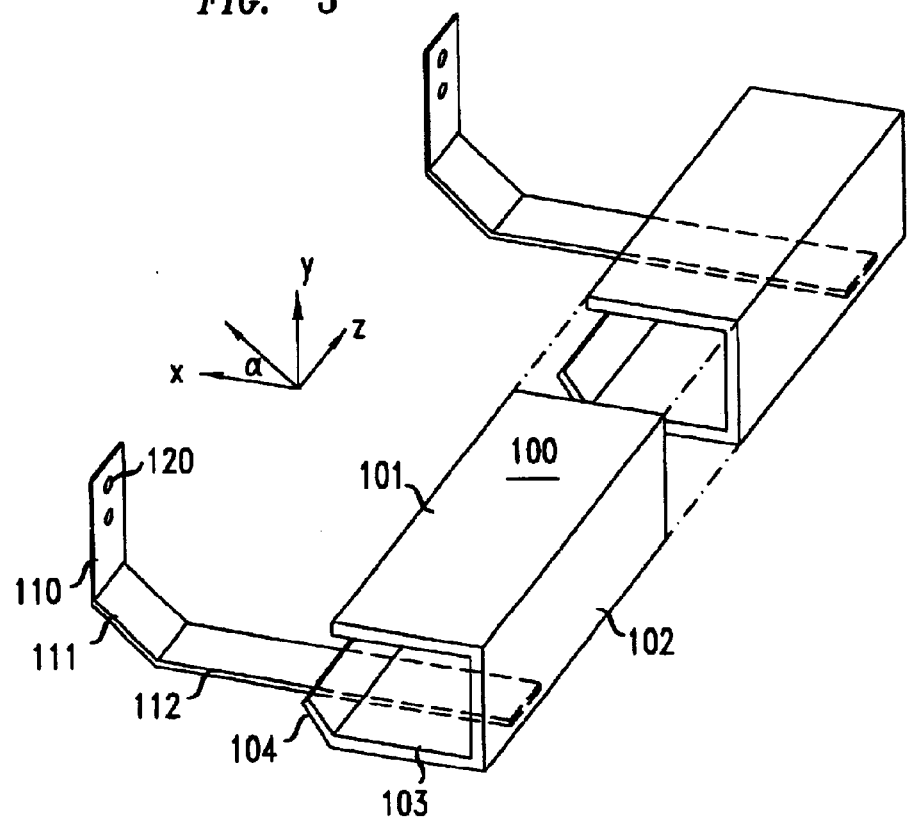
Figure 4:
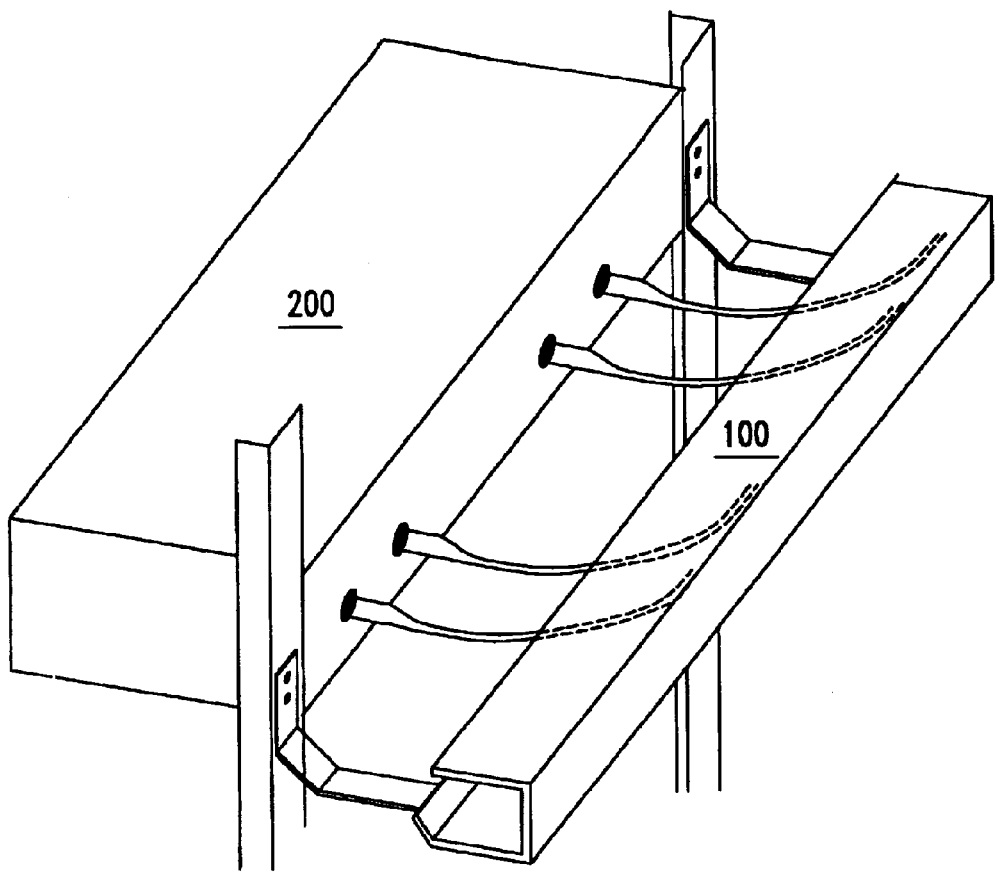
Figure 5:
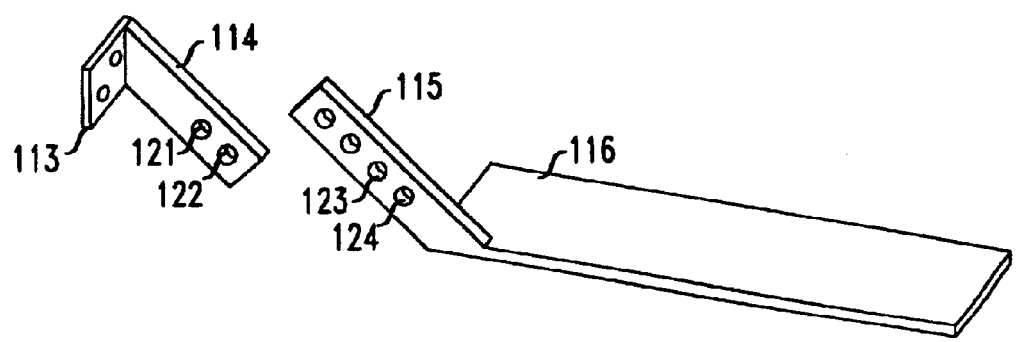
Figure 6:
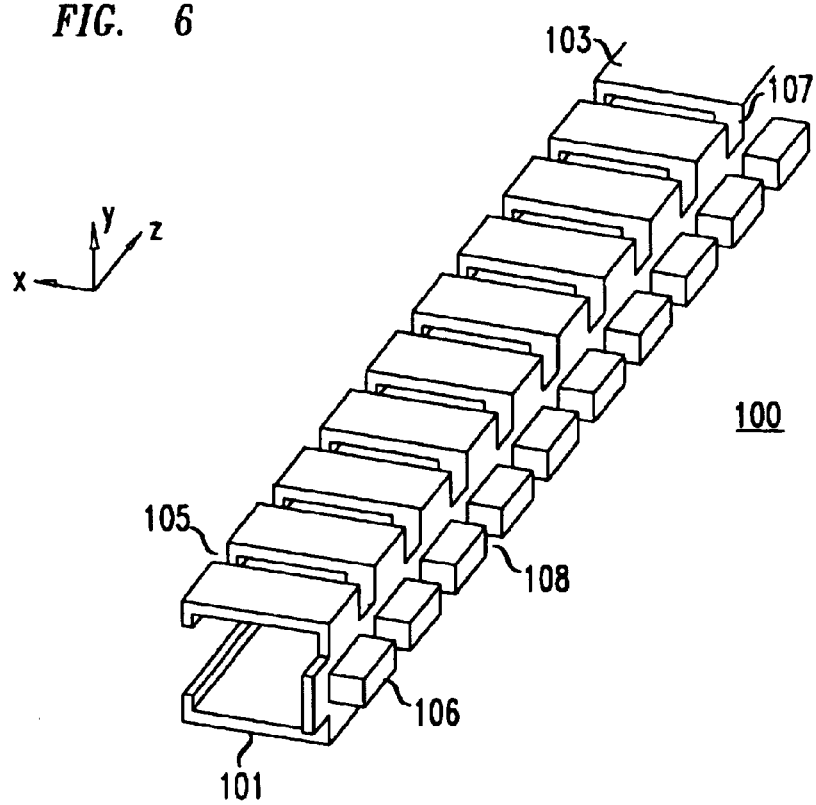
Figure 7:
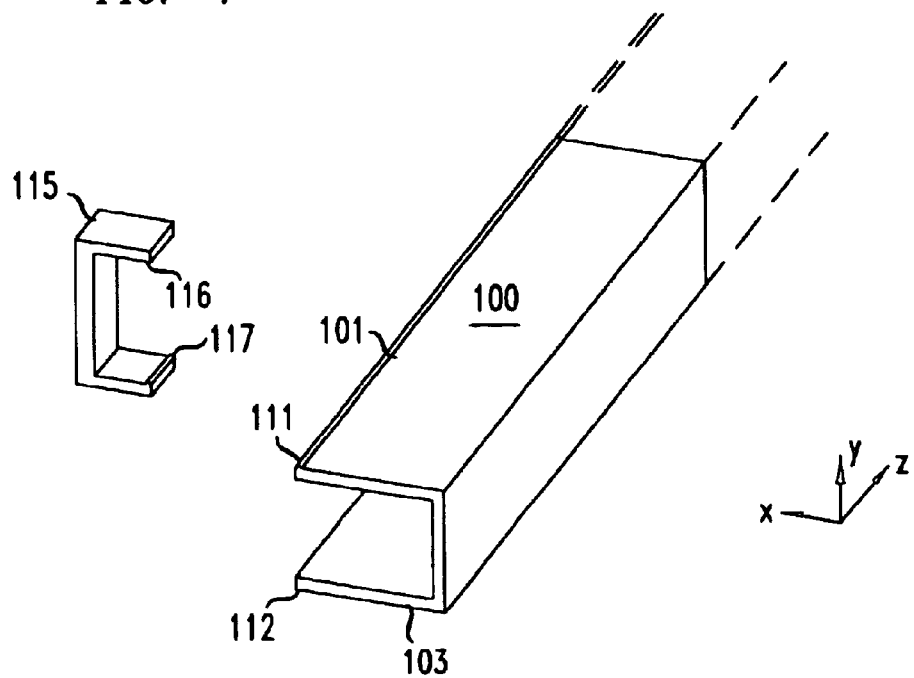

FIG. 1 shows prior art ring supports;
FIG. 2 shows prior art a "towel bar" support;
FIG. 3 depicts an assembly in conformance with the principles disclosed herein;
FIG. 4 shows the arrangement of the FIG. 3 assembly relative to a frame of equipment with an equipment module, and the placement of fibers in the assembly;
FIG. 5 illustrates one embodiment of support members that are adjustable;
FIG. 6 illustrates a trough element that is bendable, but not at a bending radius that is less than a preselected value;
FIG. 7 illustrates a detent means to hold fibers within the trough element; and
FIG. 8 shows yet another detent means.

DETAILED DESCRIPTION

FIG. 3 presents one embodiment of a fiber support assembly in accord with the principles of this invention. Primarily, it comprises trough element 100 with sides 101 and 103, and bottom 102. The opening of the trough, opposite side 102, is partially closed off by side 104. Two support members, each formed to have surfaces 110, 111, and 112 that are bent relative to each other, and are attached to trough 100, spaced apart from each other by a preselected distance. Trough 100 and the two support members can be made of the same material, such as aluminum, or relatively rigid plastic, and the support members are attached to trough 100 in an appropriate manner. For example, when the material used is aluminum, the support members may be spot-welded, or screwed, to side 103 of trough 100. The angles that surface 111 is made to have with respect to surfaces 110 and 112 are such that when surface 110 is in the vertical plane (the plane formed by axes y and x), surface 112 and sides 101 and 103 are roughly in the horizontal plane (defined by axes x and z), resulting in the trough opening being roughly in the vertical plane. It should be understood that the purposes of trough 100 are served well even when the opening of trough element 100 is somewhat away from the vertical plane; for example, away by 20 degrees. Surface 110 includes a number of holes 120 adapted for attaching the entire FIG. 3 assembly to a frame of equipment modules, or to equipment modules themselves.

It should be realized that the assembly shown in FIG. 3 is illustrative, and that various other embodiments achieve the same desired results. For example, other means can be included in surface 110 for attaching the assembly to a frame, including slots, screws, adhesives, welding bonds, chemical bonds, etc. Also, the support members can be curved rather than constructed with the two distinct bends that form surfaces 110, 111, and 112. Any means that achieves an attachment of trough 100 in front of an equipment module with the trough opening roughly facing the equipment module will suffice.

The size of side 104, and the angle of side 104 relative to the horizontal plane (in the FIG. 3 depiction) are not critical. Side 104 is effectively a detent means for keeping fibers within the trough. It is noted that arranging for surfaces 101 and 103 to be at some angle, $\alpha$, greater than zero relative to the horizontal plane assists in holding the fibers.

The advantage of the assembly depicted in FIG. 3 is that when the assembly is attached to an equipment frame, fibers coupled to an equipment module on a rack of the frame can be conveniently and easily placed in the trough without blocking the view of the equipment module, without needing to be sewn or strapped in any way, and without introducing a significant risk of the fibers being snagged, or bent with too small a radius. The attachment of trough 100 to an equipment frame, and the placement of fibers in trough 100 are depicted in FIG. 4, where equipment module 200 has four front-panel fiber outlets, and four fibers extend from the fiber outlets into trough 100. It is noted that not all aspects of the assembly shown in FIG. 4 are to scale because the drawing intends to highlight the trough assembly. In practice, trough 100 is constructed from tubing with a cross section that is, perhaps, one inch by half inch, and a length between the support members that is approximately 19 inches (for a 19 inch frame).

While the FIG. 3 assembly depicts support members that are fixed by design, FIG. 5 presents a support member design that is adjustable. It includes a first member with segments 113 and 114, and a second member with segments 115 and 116. Segment 113 corresponds to surface 110 in FIG. 3, segment 116 corresponds to surface 112 in FIG. 3, and segments 114 and 115 correspond to surface 111 in FIG. 3. Segment 114 is depicted with two holes, 121 and 122, and segment 115 is depicted with a plurality of holes. By aligning holes 121 and 122 with a chosen pair of holes in segment 116, such as holes 124 and 125, the distance between segments 113 and 116 can be controlled. The coupling can be effected with screws that go through the holes, or with some other means. An interesting variation results when the coupling means through one of the holes is merely a rod (e.g., a rivet) while the other coupling means is a screw. Temporarily removing the screw allows trough 100 to be rotated somewhat, for example, downward and away from the panel of the equipment with which the trough is associated, so that workmen can get easy access to the equipment.

It is expected that the trough design shown in FIG. 3 will be adequate for most applications, but it is observed that while the FIG. 4 assembly insures that fibers are conveniently tucked away from harm in the vicinity of the equipment, in most applications those fibers extend to a remote piece of equipment, and the traversal from one piece of equipment to another often includes bending of the fibers. FIG. 6 depicts a design where, conveniently, trough element 100 is made of somewhat pliable material that permits bending (e.g. a flexible plastic material). In FIG. 6, trough 100 includes slots 105 in sidewalls 101 and 103. The bottom that has slots 107 and protrusions 106 that have slots 108 between them. Slots 107 allow bending of trough 100 in the y-z plane, and slots 105 and 108 allow bending of trough 100 in the x-z plane. The width of the slots and protrusions and the distances between them are arranged to permit such bending of trough member 100 with a radius that is not less than a pre-designed value, thereby insuring that fibers placed within trough 100 are not subjected to undue stress.

The above disclosed the principles of this invention, but it should be realized that various modifications and alterations can be made by those who are skilled in the art without departing from the spirit of this invention. For example, FIG. 3 employs a partial wall 104 as a detent means. FIG. 7 presents a more positive detent means in the form of outer ridges 111 and 112 on sides 101 and 103, and a detent clip 115 that includes corresponding ridges 116 and 117. When clip 115 is snapped into the opening of trough 100, ridges 116 and 117 interlock with ridges 111 and 112 to prevent clip 115 from snapping off, but clip 115 can easily slide along the long axis of trough 100. The sliding movement prevents fibers that are inserted in trough 100 from assuming a bending radius of less than a pre-selected value.

FIG. 8 presents yet another detent means, which builds on the FIG. 3 trough. A strip, which comprises a plastic snap portion 126 to which a neoprene wiper portion 125 is attached, is snapped onto the respective edges of sides 101 and 104. As depicted in FIG. 8, the two wiper portions allow easy placement of fibers into trough 100, but make it difficult for fibers to come out.

What is claimed is:

1. An assembly comprising:

a trough element having a trough opening along a long dimension thereof and two ends perpendicular to said long dimension, and a support subassembly coupled to said trough element and adapted to be fixedly attached to an apparatus in a manner that causes said trough opening to generally face a vertical surface of said apparatus at a distance from a nearest face of said apparatus that is greater than 0 inches;

said subassembly including at least two attachment structures, and each of said structures includes two elements that are connected relative to each other at an adjustable angle, thereby enabling said trough opening to be at an adjustable angle relative to vertical surface of said apparatus.

2. An assembly comprising:

a trough element having a trough opening along a long dimension thereof and two ends perpendicular to said long dimension; and a support subassembly coupled to said trough element and adapted to be fixedly attached to an apparatus in a manner that causes said trough opening to generally face said apparatus at a distance from a nearest face of said apparatus that is greater than 0 inches, wherein said trough element includes slots in sides of said trough element to enable said trough element to be bent in a plane containing a long axis of said trough element and perpendicular to said sides.

3. An assembly comprising:

a trough element having a trough opening along a long dimension thereof and two ends perpendicular to said long dimension; and a support subassembly adapted to be attached to an apparatus, and further adapted to be adjustably connected to said trough element;

said subassembly including at least two attachment structures, and each of said structures includes two elements that are connected to each other at an adjustable angle, thereby enabling said trough element to be at an angle other than a direct facing of said trough opening to a front vertical plane of said apparatus.

* * * * *